(12) United States Patent
Kosaka

(10) Patent No.: US 8,243,811 B2
(45) Date of Patent: Aug. 14, 2012

(54) SYSTEM AND METHOD FOR NOISE FILTERING DATA COMPRESSION

(75) Inventor: Takashi Kosaka, San Carlos, CA (US)

(73) Assignee: Takashi Kosaka, San Carlos, CA (US)

( * ) Notice: Subject to any disclaimer, the term of this patent is extended or adjusted under 35 U.S.C. 154(b) by 1199 days.

(21) Appl. No.: 11/947,216

(22) Filed: Nov. 29, 2007

(65) Prior Publication Data
US 2008/0152022 A1    Jun. 26, 2008

Related U.S. Application Data

(60) Provisional application No. 60/861,978, filed on Dec. 1, 2006.

(51) Int. Cl.
  *H04N 7/12* (2006.01)
  *G06K 9/36* (2006.01)
(52) U.S. Cl. ............ 375/240.18; 382/236; 382/248; 382/250
(58) Field of Classification Search .................. None
See application file for complete search history.

(56) References Cited

U.S. PATENT DOCUMENTS

| | | | | |
|---|---|---|---|---|
| 6,633,610 | B2 * | 10/2003 | Acharya | 375/240.11 |
| 2005/0060421 | A1 * | 3/2005 | Musunuri et al. | 709/231 |
| 2005/0276329 | A1 | 12/2005 | Adiletta et al. | |

FOREIGN PATENT DOCUMENTS
WO    WO-2005/010632    2/2005

OTHER PUBLICATIONS
Search Report for PCT/US07/24611 dated May 7, 2008.

* cited by examiner

*Primary Examiner* — Gary Mui
*Assistant Examiner* — Hicham Foud
(74) *Attorney, Agent, or Firm* — Rader Fishman & Grauer, PLLC

(57) ABSTRACT

Noise filtering data compression removes noise differences from successive frames in a video signal. This is accommodated by accessing successive frames corresponding to a video signal. Frequency domain representations, for example first row and first column coefficients in the quantized DCT result matrix, are used to determine whether the block in the current frame should be considered identical to the corresponding block in the previous frame. If such is the case, the block data is rendered identical such as by overwriting one for the other. This removes any noise differential between the corresponding blocks from the successive frames.

18 Claims, 6 Drawing Sheets

SYSTEM AND METHOD FOR NOISE FILTERING DATA COMPRESSION

CROSS REFERENCE TO RELATED APPLICATIONS

This application claims priority under 35 U.S.C. §119 to previously filed U.S. provisional application Ser. No. 60/861,978, filed on Dec. 1, 2006 by Takashi Kosaka and entitled "System and Method for Data Compression," the entire contents of which are hereby incorporated by reference.

BACKGROUND OF THE INVENTION

1. Field of the Invention

This invention relates generally to data compression and more particularly to data compression by eliminating unnecessary data representative of noise in related video frames.

2. Description of the Related Art

For motion compression by MEPG, MPEG treats the video as a frame unit, and uses differences between the continuous frames to perform compression. That is, compression relies upon the fact that the similarities between successive frames do not need to be repeatedly stored; instead, only the differences between the frames generally need to be stored.

Motion picture data converted to A/D contains noise (this noise is not photo's random noise) that varies per frame unit. However, to the human eye these noises are present even where sequential frames in the motion picture appear to be the same. For example, even when a motion-less object is recorded in a controlled environment, the resulting frame data will have different pixel values in the RGB domain.

A P-Picture for a system like MPEG uses difference data to perform motion compression. Compression rate increases where there is a lot of difference data. Since the noise data is treated as difference data, the compression rate decreases as a result of noise, even if the noise is for a picture having motion-less objects as described above.

SUMMARY OF THE INVENTION

The present invention provides noise filtering data compression. According to one aspect, noise filtering data compression removes noise differences from successive frames in a video signal. This is accommodated by accessing successive frames corresponding to a video signal (e.g., a current frame and a previous frame). It is determined whether a component of a given block in the current frame should be considered identical to the component of the corresponding given block in the previous frame by comparing respective representations of the components of the blocks in the frequency domain. For example, coefficients in the quantized DCT result matrix may be compared to support this determination. When it is determined that the component of the given block should be considered identical to the component of the corresponding given block in the previous frame, they are caused to be identical. For example, this may be done by overwriting the relevant block data for the current block with that from the previous block.

In one example, determining whether the component of the given block in the current frame should be considered identical to the component of the corresponding given block in the previous frame may comprise accessing respective frequency domain result matrices for the component in the current frame and the previous frame, and determining that the component of the given block in the current frame should be considered identical to the component of the corresponding given block in the previous frame where a plurality (or majority) of the values in the first row and a plurality (or majority) of the values in the first column in the respective frequency results matrices are equal as between the current frame and the previous frame. In one embodiment, the first five values in the row and column of respective 8×8 frequency results matrices may be effective.

The present invention can be embodied in various forms, including business processes, computer implemented methods, computer program products, computer systems and networks, user interfaces, application programming interfaces, and the like.

BRIEF DESCRIPTION OF THE DRAWINGS

These and other more detailed and specific features of the present invention are more fully disclosed in the following specification, reference being had to the accompanying drawings, in which.

DETAILED DESCRIPTION OF THE INVENTION

Figure 1:
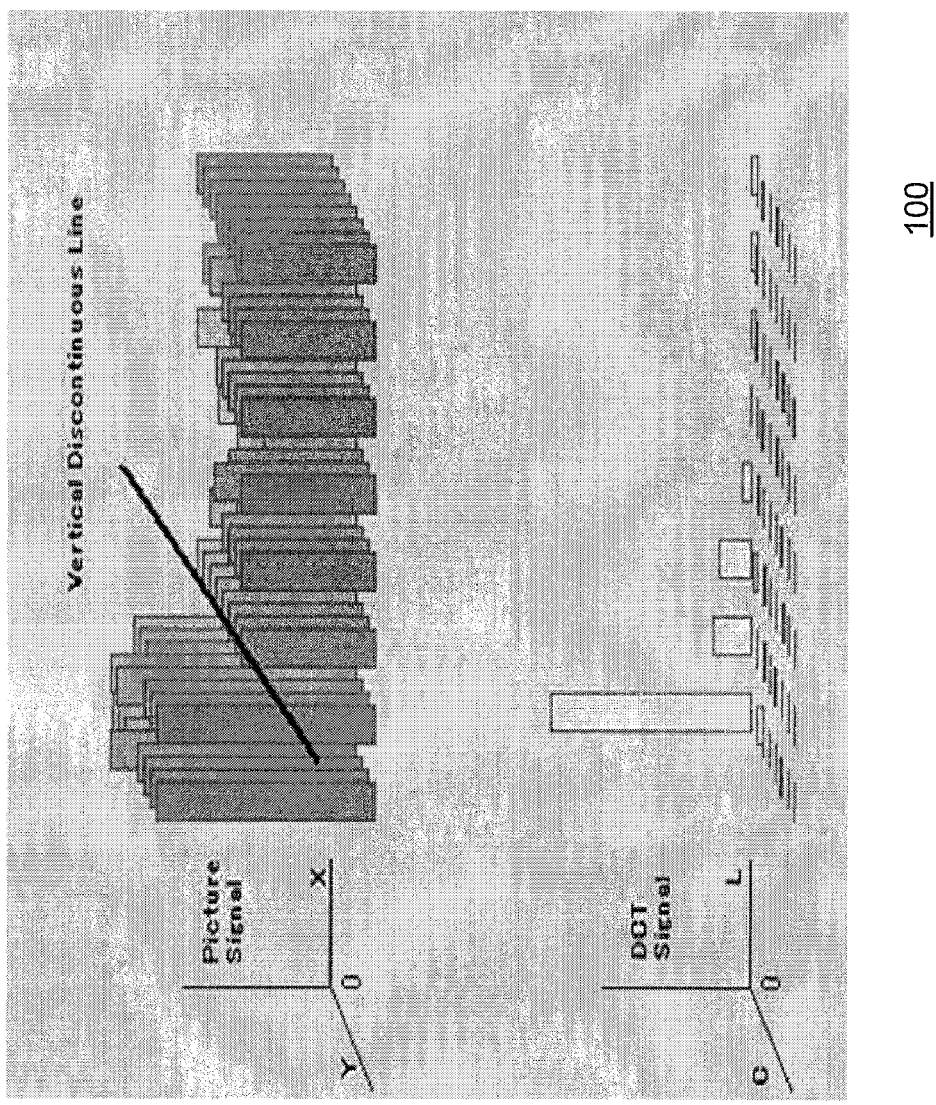
FIG. 1 is a schematic diagram illustrating an example of a vertical discontinuous line and corresponding DCT signal data.

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

According to one aspect, the present invention determines whether successive portions of a frame (e.g., an 8×8 pixel block) should be considered identical, and if such is the case, ensures that substantially identical noise is represented for the same corresponding portion (e.g., the same corresponding 8×8 pixel block) in successive frames. By doing this, the data inherits the same noise, and as a result there will be no difference due to differences in the noise data. This reduces differences due to such noise and thus increases the compression rate.

In one example, successive 8×8 pixel blocks are determined to be identical by comparing the first row and the first column of coefficients in the DCT result matrix (following DCT transform and quantization) for the same position in a picture. The comparison is performed on a block-by-block basis, within respective frames.

In one example, the noise is made to be substantially identical by rewriting frame N's data over the original N+1 frame per luminance and chrominance difference signal components.

As described above, the present invention may be embodied in various forms, including but not limited to computer systems and computer program products. By way of example, the computer system may implement a processor and memory, with the former executing instructions stored in memory to carry out the functionality described herein. It is understood that any conventional computing component may be implemented. It is also understood that the computing component may be a personal computer, laptop computer, consumer electronics, portable computer, cellular phone, etc.

The inputted motion pictures perform compression per frame unit, and judge the existing motion pictures that are same between frame N and frame N+1. This judgment is not based on finding the exact match between the motion pictures. Instead, comparison of characteristics that the motion pictures share facilitates the decision.

The precondition for the decision is done by YUV conversion that divides the motion picture in 8×8 regions. Alternatively, RGB or other conversion may be implemented, but YUV conversion is discussed primarily below to avoid confusion. If the inputted motion pictures are already in YUV, then each element is divided into 8×8 regions. The original data for the divided luminance and chrominance difference signal components are stored.

The filter performs DCT (Discrete Cosine Transform) to luminance and chrominance difference signal components, and then executes quantization. The quantization is done by multiplying Table 1 by a floating point number's coefficient (e.g., $0.02 \leq \text{coefficient} \leq 2.55$). When the coefficient's value is small, closer examination of quantization luminance and chrominance difference signal components is done, and as the coefficient's value increases, the level of examination decreases.

TABLE I

| |
| --- |
| 17, 17, 21, 24, 28, 36, 41, 47, |
| 17, 19, 21, 27, 29, 33, 43, 47, |
| 19, 21, 27, 35, 39, 41, 45, 49, |
| 23, 25, 33, 39, 43, 47, 59, 60, |
| 27, 28, 39, 47, 55, 57, 69, 80, |
| 37, 39, 47, 68, 69, 71, 73, 81, |
| 45, 46, 49, 78, 79, 80, 82, 82, |
| 47, 49, 50, 79, 80, 81, 82, 83 |

The quantized data makes the 8×8 motion picture's frequency characteristics for luminance and chrominance difference signal components. For the 8×8 data that underwent DCT and quantization processes, (0, 0) becomes the component for direct current, and other values become alternating currents.

DCT assumes that the factors in 8×8 areas are physically continuous values (like water surface or film). When the factors are physically continuous, the resulting frequency matrix of DCT concentrates to (0,0) (e.g., if all values are same, the resulting frequency of DCT has only value of (0,0)). When the factors in 8×8 area are discontinuous values, the result of the frequency matrix is diffusion. However the diffusion of values in the matrix has characteristics by the discontinuous line (boundary) in 8×8 areas. The discontinuous line (boundary) has direction in 8×8 area. The characteristic is related by the direction of the discontinuous line (boundary). When the direction of the discontinuous line (boundary) is vertical in 8×8 areas, the resultant frequency matrix is strongly affected in the first row of the matrix. FIG. 1 is a schematic diagram illustrating an example of a vertical discontinuous line and corresponding DCT signal data (100).

Figure 2:
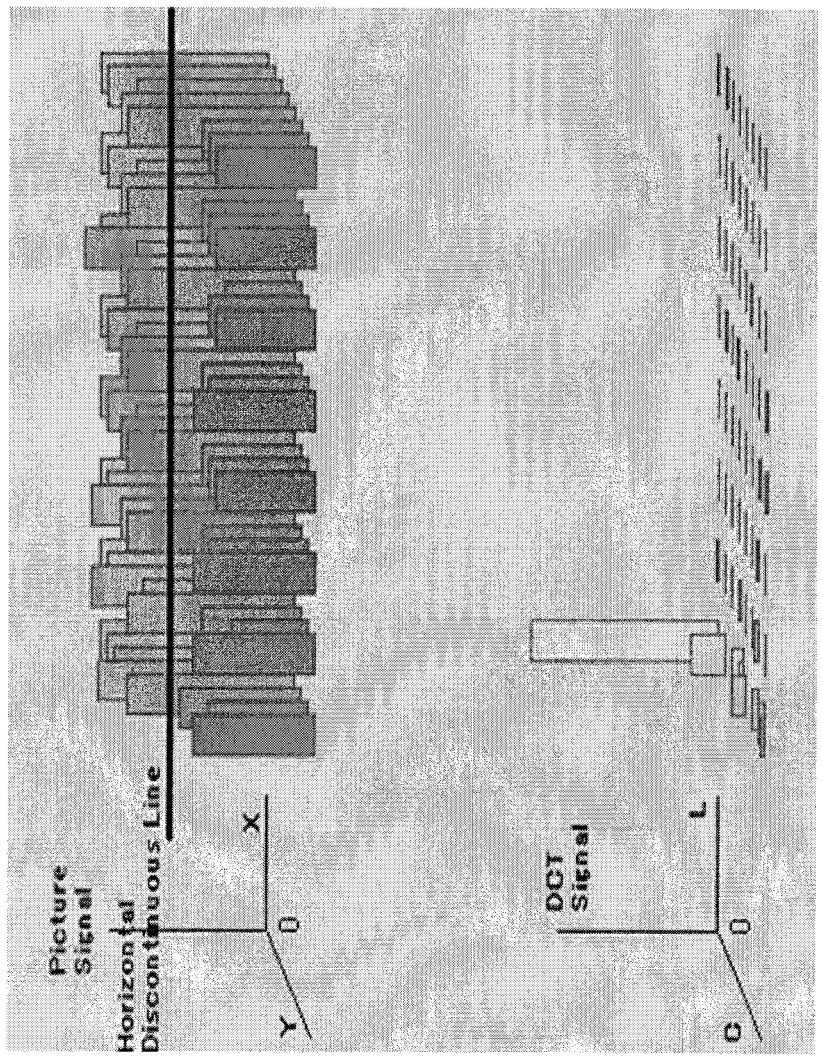
FIG. 2 is a schematic diagram illustrating an example of a horizontal discontinuous line and corresponding DCT signal data.

Also, when the direction of the discontinuous line (boundary) is the horizontal, the result frequency matrix strongly affects the first column of the matrix. FIG. 2 is a schematic diagram illustrating an example of a horizontal discontinuous line and corresponding DCT signal data (200). If the direction of the discontinuous line (boundary) is horizontal and vertical, the first row and the first column of the matrix are affected by DCT calculation.

Therefore, the decision whether one has the same 8×8 picture in two frames compares the first row and column of the DCT result matrix in the same position of the picture. Also, high order of the first row and column in the matrix represents high frequency value of luminance and chrominance different signal components. High frequency component might be 0 by the quantization.

To further explain the significance of the first row and column of the DCT result matrix, it is noted that the DCT result matrix represents frequency characteristics of Y, U and V. The frequency characteristics comes together low frequency by the DCT. The low frequency represents major characteristics of the 8×8's Y, U and V. Comparison of more than the first row and column results in the collection of high frequency characteristics, and these high frequency characteristics might be noises or unknown value.

As also noted, the human eye cannot recognize high frequency in the picture particularly as it changes from frame-to-frame. Therefore the system compares a pair of Y, U or VcN(x+a,y+a) and Y, U or VcN−1(x+a,y+a) (where a ranges from 0 to n) in the first row and column. When the YcN(x,y) and YcN−1(x,y) is different, the corresponding 8×8 block in the physical position of (x, y) is different (e.g., there is motion, or the scene has changed).

When the filter decides that the data have the same characteristics, frame N's original data is rewritten over the original N+1 frame per luminance and chrominance difference signal components. By doing this, noise gets inherited in frame intervals; therefore, there is no more difference in noise data.

To further explain, it is noted that the result of frequency matrix of DCT in Y, U and V, does not represent physical position in the original 8×8 block. In case of two dimensional matrix of the DCT's result represents frequency order. The lowest (such as DC) is in location (0,0) and the high frequency is in location (7,7) of the 8×8 matrix.

When the result matrix of the DCT and the quantization has high frequency coefficients, the original 8×8 data (Y, U and V) has the following:
(1) The original 8×8 block has discontinuous region(s); and
(2) The original 8×8 block has specific texture of the object's surface or noises.

When the original 8×8 block has discontinuous regions, the result matrix strongly affects the first row or column. (See, e.g., FIGS. 1 and 2). This is why the first row and column in frame N and frame N−1 are preferably compared at each result of the matrix. When the same DCT result matrix for Frame N and Frame N−1 is different, the original 8×8 block is quite a different picture in the same position.

When the process is finished, frame N+1's data becomes frame N's data, and then prepares to perform the same process over for this newly created frame N. The process thus determines whether blocks should be considered identical and removes additional noise, which increases compression efficiency.

The details of the determination and comparison of coefficients is further explained as follows. Of course, the frame data is represented by RGB24 pixel data. RGB24 pixel data is converted to YUV data, where Y, U and V represent the frame pictures. Each Y, U and V is divided 8×8 block data by the filter system. For instance, Frame N, x and y is block location in the frame.

```
For Y:
   YN(x,y), YN(x+1,y), YN(x+2,y)... YN(x+n,y)
   YN(x,y+1), YN(x+1,y+1), YN(x+2,y+1), .. YN(x+n, y+1).
   ..
   .
   .
   YN(x,y+n), YN(x+1,y, n), yN(x+2,y+1), YN(x+n,y+n).
For U:
   UN(x,y), UN(x+1,y), UN(x+2,y) ... UN(x+n,y)
   UN(x,y+1), UN(x+1,y+1), UN(x+2,y+1), .. UN(x+n,y+1).
   ..
   .
   .
   UN(x,y+n), UN(x+1,Y,n), UN(x+2,y+1), UN(x+n,y+n).
For V:
   VN(x,y), VN(x+1,y), VN(x+2,y) ... VN(x+n,y)
   VN(x,y+1), VN(x+1,y+1), VN(x+2,y+1), .. VN(x+n,y+1).
   ..
   .
   .
   VN(x,y+n), VN(x+1,Y,n), VN(x+2,y+1), VN(x+n,y+n).
```

For instance, YN(0,0) may have the following values in an 8×8 matrix as illustrated in Table II.

TABLE II

| |
|---|
| 10, 10, 11, 91, 91, 93, 92, 91 |
| 11, 10, 11, 92, 91, 93, 92, 93 |
| 10, 11, 11, 93, 91, 93, 93, 91 |
| 12, 12, 12, 94, 91, 93, 95, 94 |
| 10, 10, 13, 92, 91, 93, 92, 91 |
| 8, 11, 12, 91, 91, 93, 93, 93 |
| 11, 14, 15, 90, 91, 93, 92, 91 |
| 11, 13, 12, 94, 91, 93, 96, 92 |

YN(x,y) to YN(x+n,y+n) are executed by DCT and quantization to become YcN(x,y) to YcN(x+n,y+n).

UN(x,y) to UN(x+n,y+n) and VN(x,y) to VN(x+n,y+n) are executed by DCT and quantization to become UcN(x,y) to UcN(x+n,y+n) and VcN(x,y) to VcN(x+n,y+n).

For instance YcN(0,0) has the following 8×8 frequency coefficients as illustrated in Table III below.

TABLE III

| |
|---|
| DC , AC01, AC02, AC03, AC04, AC05, AC06, AC07 |
| AC10, AC11, AC12, AC13, AC14, AC15, AC16, AC17 |
| AC20, AC21, AC22, AC23, AC24, AC25, AC26, AC27 |
| AC30, AC31, AC32, AC33, AC34, AC35, AC36, AC37 |
| AC40, AC41, AC42, AC43, AC44, AC45, AC46, AC47 |
| AC50, AC51, AC52, AC53, AC54, AC55, AC56, AC57 |
| AC60, AC61, AC62, AC63, AC64, AC65, AC66, AC67 |
| AC70, AC71, AC72, AC73, AC74, AC75, AC76, AC77 |

The system compares a pair of YcN(x+a,y+a) and YcN−1(x+a,y+a) in first row and column (DC, AC01, AC02, AC03, AC04, AC05, AC10, AC20, AC30, AC40, AC50) and UcN(x+a,y+a) and UcN−1(x+a,y+a), VcN(x+a,y+a) and VcN−1(x+a,y+a), where a is 0 to n, and N−1 is previous frame of N.

When DC, AC01, AC02, AC03, AC04, AC05, AC10, AC20, AC30, AC40 and AC50 of YcN(0,0) and DC, AC01, AC02, AC03, AC04, AC05, AC10, AC20, AC30, AC40, and AC50 of YcN−1(0,0) are the same value, the system decides that YcN(0,0) and YcN−1(0,0) are the same.

YcN(0,0) and YcN−1(0,0) are considered the same if the following conditions are present:
DC of YcN(0,0)−DC of YcN−1(0,0)=0
AC01 of YcN(0,0)−AC01 of YcN−1(0,0)=0
AC02 of YcN(0,0)−AC02 of YcN−1(0,0)=0
AC03 of YcN(0,0)−AC03 of YcN−1(0,0)=0
AC04 of YcN(0,0)−AC04 of YcN−1(0,0)=0
AC05 of YcN(0,0)−AC05 of YcN−1(0,0)=0
AC10 of YcN(0,0)−AC10 of YcN−1(0,0)=0
AC20 of YcN(0,0)−AC20 of YcN−1(0,0)=0
AC30 of YcN(0,0)−AC30 of YcN−1(0,0)=0
AC40 of YcN(0,0)−AC40 of YcN−1(0,0)=0
AC50 of YcN(0,0)−AC50 of YcN−1(0,0)=0

Corresponding overwriting follows the relevant determination of sameness. That is, when YcN(0,0) and YcN−1(0,0) are the same, the system overwrites YN(0,0) from YN−1(0,0). When UcN(10,10) and UcN−1(10,10) are the same, the system overwrites UN(10,10) from UN−1(10,10). When VcN(32,21) and VcN−1(32,21) are the same, the system overwrites VN(32,21) from VN−1(32,21).

As evident from the above description, in one embodiment the first 5 values in each of the first row and the first column of corresponding quantized DCT results matrices (8×8) from successive frames are compared to see whether the values are equal in support of a conclusion of the components in the respective blocks being the same for the purposes of filtering noise. Although this is preferred, fewer or greater values may potentially be compared. Currently it is believed that for an 8×8 matrix, comparing 6 values may also be somewhat effective, but that comparing only 4 values may not be very effective, and that comparing 7 or 8 values may be ineffective as these may represent a lot of high frequency values (such as noise). Of course, for differently sized blocks and differently sized matrices the number of values to compare may differ. It should also be noted that the values for the purpose of assessing whether they are equal can be variously constructed, such as by configuring the coefficients for quantization. Additionally, a determination whether two corresponding values are equal may be carried out to whatever level of precision is desired (that is, the numbers can be rounded to an integer or desired decimal place).

FIGS. 3-6 illustrate examples of systems and processes corresponding to noise filtering data compression as described in detail above.

Figure 3:
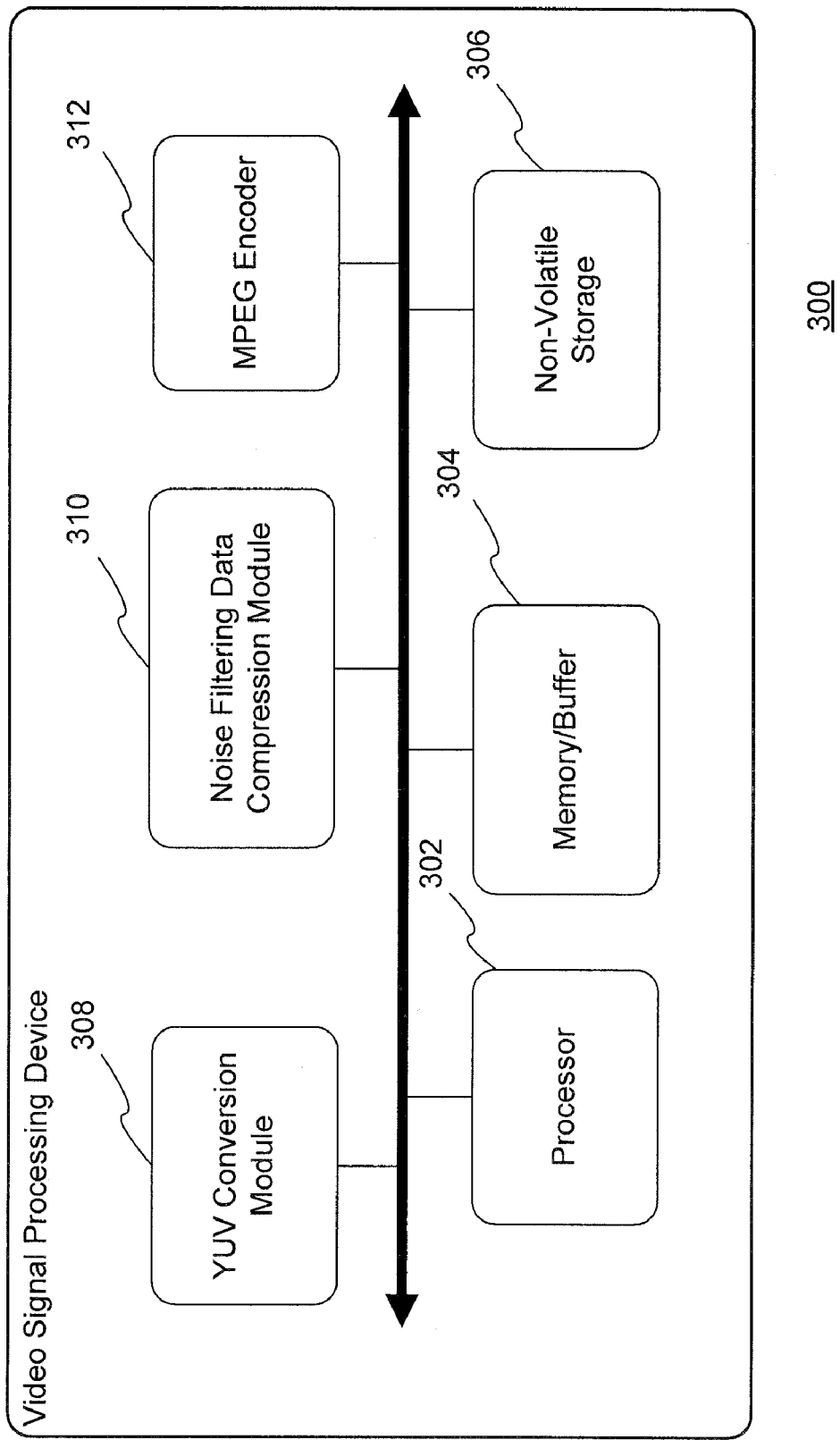
FIG. 3 is a block diagram illustrating an example of a video signal processing device with a noise filtering data compression module.

FIG. 3 is a block diagram illustrating an example of a video signal processing device 300 with a noise filtering data compression module 310. The video signal processing device includes a processor 302 and memory 304 which may, among other things, be used to buffer data being processed by the video signal processing device. A non-volatile storage 306 is also preferably provided, such as a hard disk or removable flash memory device. The video signal processing device 300 may be any number of different devices that could take advantage of the improved noise filtering and compression provided by the noise filtering data compression module 310. For example, the video signal processing device 300 may be a video camera, a still camera that captures video signals, a digital video recording (DVR) device, or any device that captures, receives, inputs, or otherwise accesses video signals and potentially applies MPEG compression to store, transmit or otherwise process the corresponding video data. The video signal processing device 300 may also be used in a system that broadcasts or otherwise outputs encoded video data that has been noise filtered as described herein.

The video signal processing device 300 is configured to receive a video signal, which can originate from any number of external or internal devices. The video signal is processed by the noise filtering data compression module 310 according to an embodiment of the present invention. If necessary, a YUV conversion module 308 may initially process the input video signal to convert the signal to provide YUV frame data to the noise filtering data compression module 310. Alternatively, the input signal may already be in this format, or the function may be performed by the noise filtering data compression module 310.

The noise filtering data compression module 310 operates to remove noise data from successive frames. In accomplishing this, the noise filtering data compression module 310 may engage in DCT transformation and quantization of the YUV frame data in order to determine whether successive frames should be the same, as described in further detail above. Upon such a determination, an update may be made to the YUV frame data to remove the noise. The YUV frame data may then be provided to an MPEG encoder 312, which will naturally result in an improved compression rate due to the removal of the noise from the YUV frame data.

It should be noted that YUV frame data and DCT transformation are repeatedly described as examples for ease and consistency of discussion. However, the present invention is not limited to YUV frame data applications. For example, processing of RGB frame data or other representations may be used. Additionally, the present invention is not limited to using a DCT transform. Other techniques for representing the video data in a frequency domain may be implemented. Of course, depending upon the type of transform, the number of values that provides optimum comparison may vary as well.

The noise filtering data compression module 310 is preferably provided as software executed by the processor of the device, but may alternatively comprise firmware or hardware, or combinations of software, firmware and hardware.

The noise filtering data compression module 310 accesses the frame data for the video signal, conducts any necessary transformation, analyzes components in the frequency domain corresponding to successive frames, determines whether such components should be considered identical for successive frames, and processes the frame data (e.g., overwriting current frame data) to cause the noise data to be filtered where it is determined that such should be the case.

Figure 4:
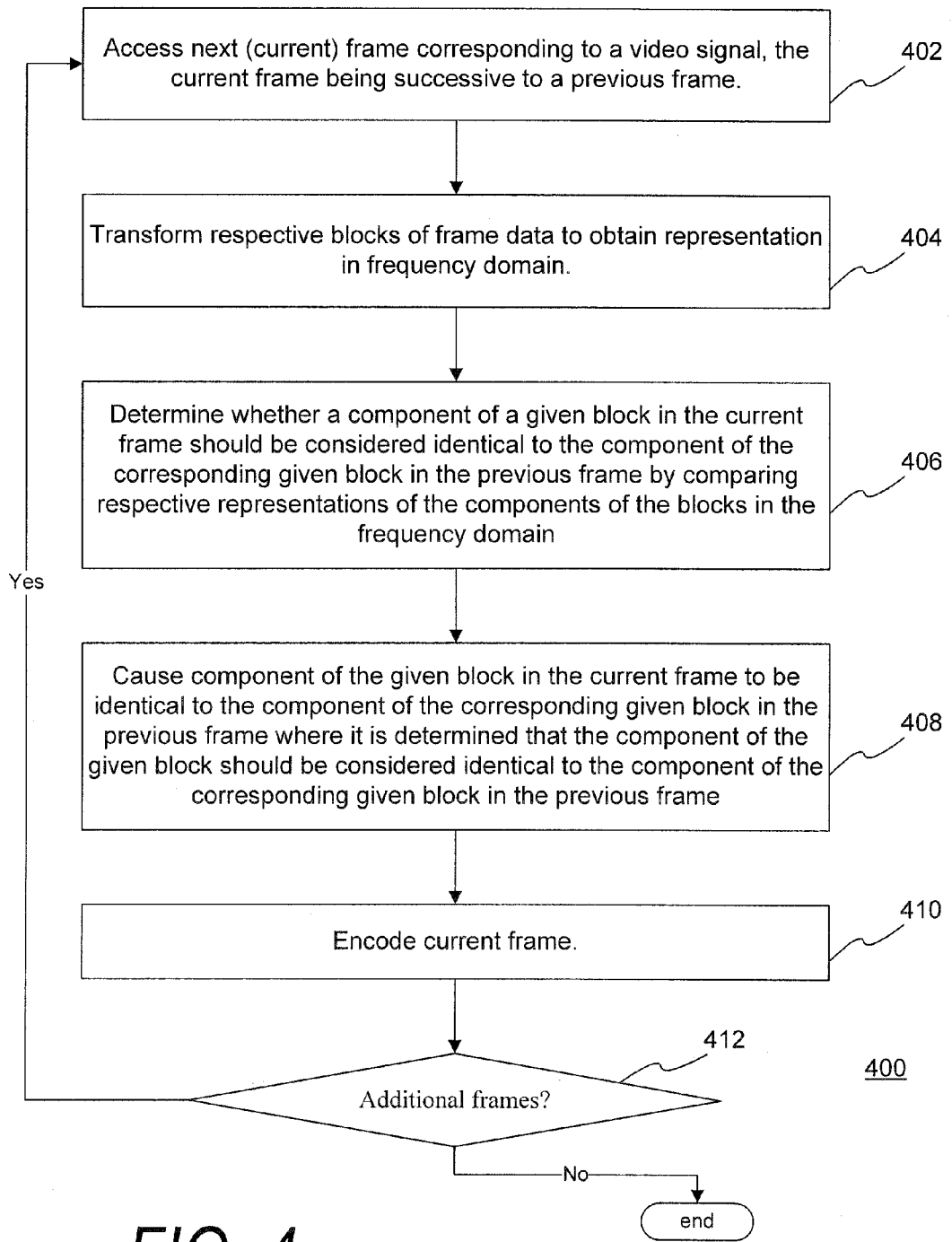
FIG. 4 is a flow diagram illustrating an example of a process for noise filtering data compression.

The flow diagram of FIG. 4 further illustrates the functionality of the noise filtering data compression module 310 and process 400 for noise filtering data compression.

The process 400 entails accessing 402 a current frame corresponding to a video signal, with the current frame being successive to a previous frame that has been/is being processed. A buffer may store the frame data as well as transformed data so that it can be used for subsequent processing needs. The current frame data is then transformed 404 to obtain representation in the frequency domain, such as by a DCT transform as described. This provides blocks of data in a DCT result matrix that correlates to the blocks of (e.g., YUV) frame data.

It is then determined 406 whether a component of a given block in the current frame should be considered identical to the component of the corresponding given block in the previous frame by comparing respective representations of the components of the blocks in the frequency domain. That is, it may be determined that the Y (and/or U, and/or V) component should be considered identical for the successive frames for the given block. Determining that the component of the given block should be considered identical may, for example, be performed by examining the first row and column of the DCT result matrix for the given block, for the current and previous frame. Where the first rows of the current/previous and first columns of the current previous are the same in the DCT result matrix, the blocks are considered the same in the YUV domain.

It should be noted that determining that the blocks "should be considered identical" does not mean that the respective (current, previous) blocks are actually identical. Rather, this means that they should be considered identical for the purposes of filtering out noise, in that they are determined not to contain motion or a different picture.

The processing continues by causing 408 the component of the given block in the current frame to be identical to the component of the corresponding given block in the previous frame where it is determined that the component of the given block should be considered identical to the component of the corresponding given block in the previous frame. Causing 408 the components to be identical may be performed by overwriting the data for given block in the current frame using the data from the previous data block.

Once this is performed, the noise data has been filtered, and the current frame may be encoded 410, taking advantage of the removal of the unnecessary difference data that resulted from noise rather than motion in the picture. Processing may continue as additional frame data is processed until there are no additional frames (412).

Figure 5:
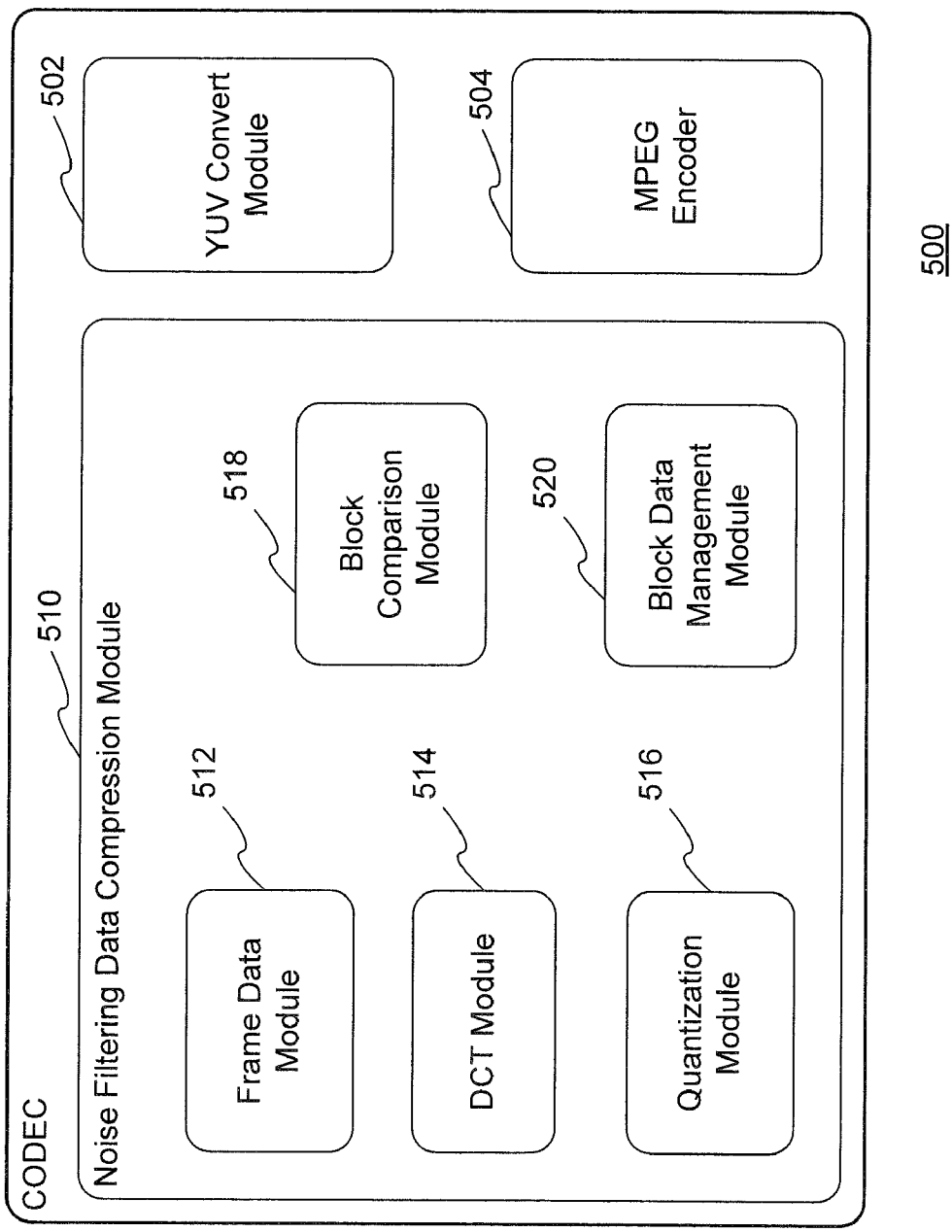
FIG. 5 is a block diagram illustrating an example of a CODEC with a noise filtering data compression module.

FIG. 5 is a block diagram illustrating an example of a CODEC 500 with a noise filtering data compression module. Although the term CODEC is used it is noted that some embodiments may merely encode and not require a decoding function, as the encoded data may be transmitted for processing elsewhere. The CODEC 500 is preferably provided as software, but may alternatively be provided as firmware, hardware, or combinations thereof. Although one modular breakdown is shown, it should be understood that the described functionality may be provided by fewer, greater, or differently named modules.

The CODEC 500 comprises a YUV convert module 502 and MPEG encoder 504 which assume the same function and role as described regarding FIG. 3 above. The noise filtering data compression module 510 comprises a frame data module 512, a DCT module 514, a quantization module 516, a block comparison module 518 and a block data management module 520. The frame data module 512 accesses and manages the frames of resulting from YUV conversion of the inbound video signal. The DCT module 514 performs the DCT transform and related operations, and the quantization module 516 quantizes the resultant DCT result matrix to provide a series of coefficients that comprise the quantized DCT result matrix. The block comparison module 518 performs the comparison of certain of these coefficients from successive frame data in order to carry out determinations of sameness (i.e., block data that should be considered identical), and the block data management module 520 carries out filtering, preferably by overwriting the current block data with the previous block data, where such sameness is determined.

Figure 6:
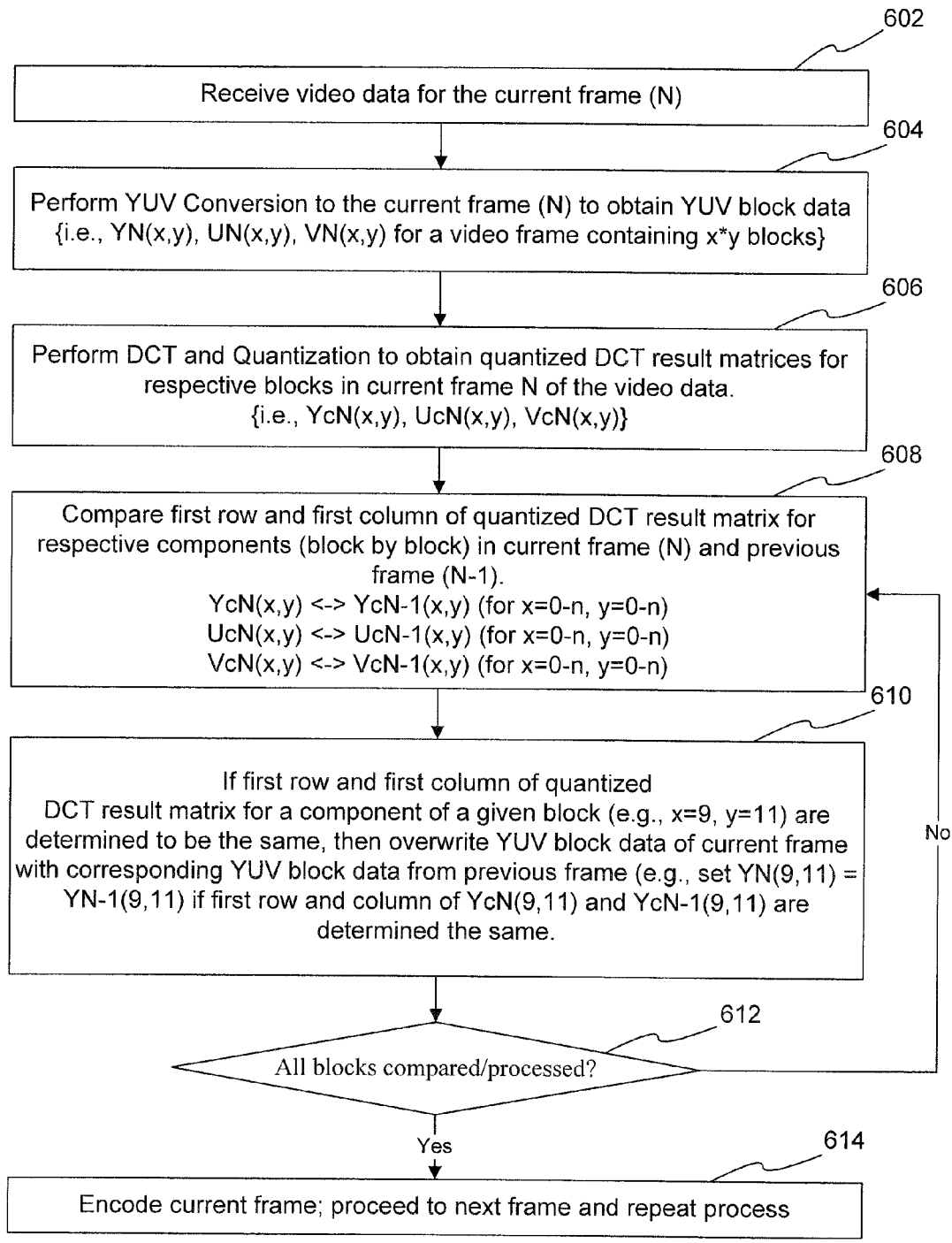
FIG. 6 is a flow diagram illustrating another example of a process for noise filtering data compression.

The functionality of these modules is further described with reference to FIG. 6, which illustrates another example of a process for noise filtering data compression 600. The video data for the current frame (N) is received 602, and YUV conversion is performed 604 upon the current frame (N) to obtain YUV block data. Particularly the luminance and chrominance components may be denoted as $YN(x,y)$, $UN(x,y)$ and $VN(x,y)$, as described further above.

DCT transform and quantization are performed 606 to obtain quantized DCT result matrices for respective blocks in the current frame N. These correlate to the YUV block data, and are denoted $YcN(x,y)$, $UcN(x,y)$ and $VcN(x,y)$, also as described further in the detailed equations above. From past processing, the corresponding quantized DCT result matrices for the previous frame have been retained (e.g., in the memory/buffer). These are denoted $YcN-1(x,y)$, $UcN-1(x,y)$ and $VcN-1(x,y)$. With this data available, a comparison 608 of the first row and first column of the quantized DCT result matrices for respective blocks in the current frame N of the video data is made. This comparison is ultimately performed for all of the blocks in the frame.

If the first row and the first column are determined to be different, then it is determined that there is motion in the picture, information that should be retained, so the processing does not overwrite the current block data (or component thereof) in that case. However, if the first row and first column of quantized DCT result matrix for a component of a given block (e.g., say the given block where x=9, y=11) are determined to be the same, then it is determined that there is not motion in the picture. In this instance, the processing overwrites the YUV block data of the current frame with corresponding YUV block data from the previous frame. Specifically, it sets YN(9,11)=YN−1(9,11) where the first row and column of quantized DCT results matrices YcN(9,11) and YcN−1(9,11) are determined to be the same. The determination that a rows/columns are the same may rely upon a subset of the values in the rows/columns, preferably a majority of the coefficients. Alternatively all of the coefficients may be examined.

The above comparison and overwriting continues until (612) all of the blocks have been processed for the frame, which may then be encoded (e.g., MPEG) 614 and stored, transmitted or otherwise processed further. The process proceeds to the "next" current frame and the described process is repeated.

Thus embodiments of the present invention produce and provide noise filtering data compression. Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A method for data compression by removing noise differences from successive frames in a video signal, the method comprising:
   accessing, by a processing unit, successive frames corresponding to a video signal, the successive frames including a current frame and a previous frame;
   determining whether a component of a given block in the current frame should be considered identical to the component of the corresponding given block in the previous frame by comparing respective representations of the components of the blocks in the frequency domain; and
   causing the component of the given block in the current frame to be identical to the component of the corresponding given block in the previous frame where it is determined that the component of the given block should be considered identical to the component of the corresponding given block in the previous frame,
   wherein determining whether the component of the given block in the current frame should be considered identical to the component of the corresponding given block in the previous frame comprises accessing respective frequency domain results matrices for the component in the current frame and the previous frame, and determining that the component of the given block in the current frame should be considered identical to the component of the corresponding given block in the previous frame where a plurality of the values in the first row and a plurality of the values in the first column in the respective frequency results matrices are equal as between the current frame and the previous frame.

2. The method of claim 1, wherein determining whether the component of the given block in the current frame should be considered identical to the component of the corresponding given block in the previous frame comprises:
   determining that the component of the given block in the current frame should be considered identical to the component of the corresponding given block in the previous frame where a majority of the values in the first row and a majority of the values in the first column in the respective frequency results matrices are equal as between the current frame and the previous frame.

3. The method of claim 2, wherein the frequency domain results matrices are quantized DCT results matrices.

4. The method of claim 3, wherein the quantized DCT results matrices are 8×8, the majority of values in the first row is the first five values, and the majority of values in the first column is the first five values.

5. The method of claim 1, wherein causing the component of the given block in the current frame to be identical to the component of the corresponding given block in the previous frame comprises overwriting data for the component of the given block in the current frame with data for the component of the corresponding given block from the previous frame.

6. The method of claim 1, wherein the component is one of a YUV component or an RGB component.

7. A system for data compression by removing noise differences from successive frames in a video signal, the system comprising:
   means for accessing successive frames corresponding to a video signal, the successive frames including a current frame and a previous frame;
   means for determining whether a component of a given block in the current frame should be considered identical to the component of the corresponding given block in the previous frame by comparing respective representations of the components of the blocks in the frequency domain; and
   means for causing the component of the given block in the current frame to be identical to the component of the corresponding given block in the previous frame where it is determined that the component of the given block should be considered identical to the component of the corresponding given block in the previous frame,
   wherein determining whether the component of the given block in the current frame should be considered identical to the component of the corresponding given block in the previous frame comprises accessing respective frequency domain results matrices for the component in the current frame and the previous frame, and determining that the component of the given block in the current frame should be considered identical to the component of the corresponding given block in the previous frame where a plurality of the values in the first row and a plurality of the values in the first column in the respective frequency results matrices are equal as between the current frame and the previous frame.

8. The system of claim 7, wherein the means for determining whether the component of the given block in the current frame should be considered identical to the component of the corresponding given block in the previous frame determines that the component of the given block in the current frame should be considered identical to the component of the corresponding given block in the previous frame where a majority of the values in the first row and a majority of the values in the first column in the respective frequency results matrices are equal as between the current frame and the previous frame.

9. The system of claim 8, wherein the frequency domain results matrices are quantized DCT results matrices.

10. The system of claim 9, wherein the quantized DCT results matrices are 8×8, the majority of values in the first row is the first five values, and the majority of values in the first column is the first five values.

11. The system of claim 7, wherein causing the component of the given block in the current frame to be identical to the component of the corresponding given block in the previous frame comprises overwriting data for the component of the given block in the current frame with data for the component of the corresponding given block from the previous frame.

12. The system of claim 7, wherein the component is one of a YUV component or an RGB component.

13. A computer program product for data compression by removing noise differences from successive frames in a video signal, the computer program product having instructions stored on a non-transitory computer readable medium and adapted to perform operations comprising:

accessing successive frames corresponding to a video signal, the successive frames including a current frame and a previous frame;

determining whether a component of a given block in the current frame should be considered identical to the component of the corresponding given block in the previous frame by comparing respective representations of the components of the blocks in the frequency domain; and causing the component of the given block in the current frame to be identical to the component of the corresponding given block in the previous frame where it is determined that the component of the given block should be considered identical to the component of the corresponding given block in the previous frame, wherein determining whether the component of the given block in the current frame should be considered identical to the component of the corresponding given block in the previous frame comprises accessing respective frequency domain results matrices for the component in the current frame and the previous frame, and determining that the component of the given block in the current frame should be considered identical to the component of the corresponding given block in the previous frame where a plurality of the values in the first row and a plurality of the values in the first column in the respective frequency results matrices are equal as between the current frame and the previous frame.

14. The computer program product of claim 13, wherein determining whether the component of the given block in the current frame should be considered identical to the component of the corresponding given block in the previous frame comprises:

determining that the component of the given block in the current frame should be considered identical to the component of the corresponding given block in the previous frame where a majority of the values in the first row and a majority of the values in the first column in the respective frequency results matrices are equal as between the current frame and the previous frame.

15. The computer program product of claim 14, wherein the frequency domain results matrices are quantized DCT results matrices.

16. The computer program product of claim 15, wherein the quantized DCT results matrices are 8×8, the majority of values in the first row is the first five values, and the majority of values in the first column is the first five values.

17. The computer program product of claim 15, wherein causing the component of the given block in the current frame to be identical to the component of the corresponding given block in the previous frame comprises overwriting data for the component of the given block in the current frame with data for the component of the corresponding given block from the previous frame.

18. The computer program product of claim 15, wherein the component is one of a YUV component or an RGB component.

\* \* \* \* \*